W. V. TURNER & P. H. DONOVAN.
BRAKE PIPE VENT VALVE DEVICE.
APPLICATION FILED OCT. 7, 1913.
1,133,341.
Patented Mar. 30, 1915.
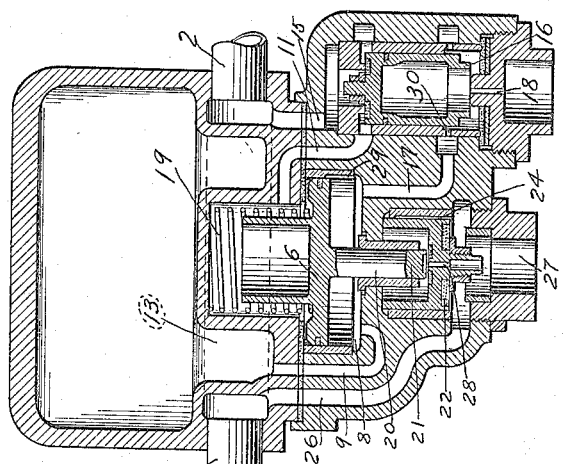
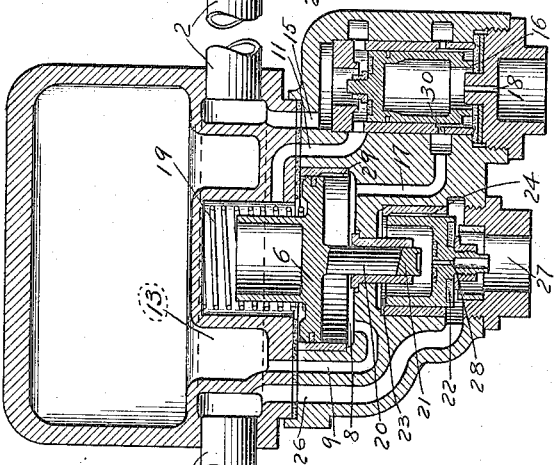
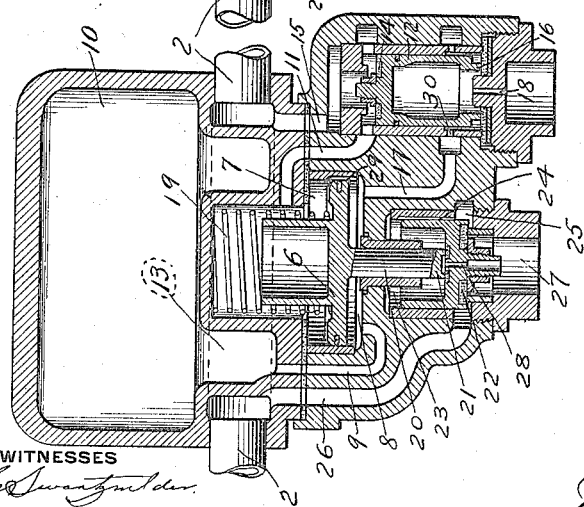
WITNESSES
INVENTORS
Walter V. Turner
Patrick H. Donovan
by Wm. H. Cady
Att'y.

UNITED STATES PATENT OFFICE.

WALTER V. TURNER AND PATRICK H. DONOVAN, OF EDGEWOOD, PENNSYLVANIA, ASSIGNORS TO THE WESTINGHOUSE AIR BRAKE COMPANY, OF WILMERDING, PENNSYLVANIA, A CORPORATION OF PENNSYLVANIA.

BRAKE-PIPE VENT-VALVE DEVICE.

1,133,341.      Specification of Letters Patent.      Patented Mar. 30, 1915.

Application filed October 7, 1913. Serial No. 793,833.

*To all whom it may concern:*

Be it known that we, WALTER V. TURNER and PATRICK H. DONOVAN, citizens of the United States, residents of Edgewood, in the county of Allegheny and State of Pennsylvania, have invented a new and useful Improvement in Brake-Pipe Vent-Valve Devices, of which the following is a specification.

This invention relates to fluid pressure brakes, and more particularly to a valve device for securing a local venting of the brake pipe in an emergency application of the brakes.

With brake pipe vent valve devices it is desirable to provide a device which will readily respond to any sudden rate of reduction in brake pipe pressure and which will close promptly when a predetermined reduction in brake pipe pressure has been effected. It is also desirable to have a large vent opening, so that the brake pipe pressure may be quickly reduced to the desired degree, but heretofore, in order to provide a sensitive valve device, it has been necessary to limit the size of the vent opening.

The principal object of our invention is to provide an improved brake pipe vent valve device which is sensitive in operation and provides a large vent opening.

In the accompanying drawing; Figure 1 is a diagrammatic view of a car air brake equipment with our improved brake pipe vent valve device applied thereto; Fig. 2 a central sectional view of the brake pipe vent valve device, showing the parts in normal position; Fig. 3 a similar view, showing the parts in the positions initially assumed upon a sudden reduction in brake pipe pressure; and Fig. 4 a similar view, showing the parts in the positions assumed following those shown in Fig. 3.

The improved brake pipe vent valve device 1 is shown in Fig. 1 of the drawing as applied to a car air brake equipment of the usual form, comprising a brake pipe 2, triple valve device 3, brake cylinder 4, and auxiliary reservoir 5.

The vent valve device 1 comprises a casing having a piston chamber containing a piston 6 dividing the piston chamber into chambers 7 and 8. Chamber 8 is connected by passage 9 to a chamber 10 for increasing the volume of the chamber 8 and chamber 7 is open to a passage 11 controlled by a closing valve device 12. The conduit of the brake pipe 2 passes through the vent valve casing by way of an unobstructed passage 13. The closing valve device is made in the form of a piston having a valve 14 for controlling communication from passage 11 to a passage 15 opening into brake pipe passage 13. The opposite end of the closing valve device has a valve ring 16 for controlling communication from a passage 17 leading to chamber 8, to a restricted passage 18 opening to the atmosphere.

The piston 6 is subject on one side to the pressure of a light spring 19, more particularly for holding the parts in normal position when there is no fluid pressure in the system and said piston carries a stem 20 having a valve 21 on its outer end adapted to engage a seat on the main vent valve 22.

The vent valve 22 has a chamber 23 on one side which is connected in the closed position of the valve through a restricted groove 24 with a chamber 25 on the opposite side, which is open through a passage 26 to the brake pipe 2. Main vent valve 22 controls a large vent opening from passage 26 to an atmospheric exhaust port 27 and said valve has a restricted port 28 controlled by valve 21 and adapted when the valve 21 is off its seat to afford communication from chamber 23 to the exhaust port 27.

In operation, when the brake pipe is charged with fluid under pressure, air flows through passage 15 to the closing valve device 12, forcing the same to its atmospheric seat. Thence fluid passes through passage 11 to chamber 7 and acts on piston 6, moving the same to the position shown in Fig. 2, in which feed groove 29 is opened. Chambers 8 and 10 are thus charged with fluid under pressure and chamber 23 is also charged from the brake pipe through passage 26, chamber 25 and groove 24. The outer face of valve 22 being exposed to atmospheric pressure and the inner face to brake pipe pressure, said valve is held firmly seated.

A small area of the valve 21 is open to atmospheric pressure through the restricted port 28 and this creates a sufficient differential of fluid pressures acting on the piston 6 to hold the parts in normal position with the valve 21 seated. Fluid under pressure also flows through passage 17 and a restricted port 30 to the annular space formed by the seating of valve 16 of the closing valve device. That portion of the area of the closing valve device outside of the seat formed by valve 16 is thus normally subject to fluid pressure, for partially balancing the fluid pressure acting on the opposite side of the closing valve device.

If a gradual reduction in brake pipe pressure is made, such as required to produce a service application of the brakes, fluid under pressure will flow from chambers 8 and 10 through feed groove 29 to chamber 7 and thence back to the brake pipe, and as the feed groove is large enough to permit such a rate of flow, the fluid pressures on opposite sides of piston 6 are maintained in equilibrium, and no movement of the parts takes place. If, however, a sudden reduction in brake pipe pressure occurs, the feed groove 29 can not take care of the flow, so that the piston 6 is actuated by the higher pressure in chamber 8 and moves to the position shown in Fig. 3. As soon as the piston 6 moves, the pilot valve 21 is lifted from its seat, and fluid is thereupon vented from chamber 23 through the restricted port 28 to the atmosphere and when the fluid pressure, acting on the exposed portion of the main valve 22 outside of its seat, exceeds the pressure acting on the opposite side of same, the main valve lifts from its seat and thereby establishes a large vent opening from the brake pipe to the atmosphere, as shown in Fig. 4 of the drawing. As soon as the main valve lifts, the full area thereof is exposed to the flow of fluid from the brake pipe and this causes the quick and full movement of the main vent valve to its wide open position.

It will be noted that when the piston 6 is in its open position and the main vent valve 22 is at its upper seat, the pilot valve 21 is off its seat on the main valve, so that the space above the valve 22 is maintained at atmospheric pressure, the groove 24 being cut off from communication with said space. This insures that the main vent valve will be held in the open position.

When the brake pipe pressure has reduced to a predetermined degree, the bottled up fluid pressure in chambers 8 and 10 acting on the exposed area of the closing valve device 12 adjacent to valve 16 is sufficient to lift the closing valve device from its atmospheric seat and as soon as this occurs, the full area thereof is immediately exposed to this bottled up pressure. Since the exhaust port 18 is restricted, the fluid pressure on the full area of the vent valve device builds up instantly and thus said device is quickly snapped to its position in which the valve 14 is seated, as shown in Fig. 4. Fluid can now flow from chambers 8 and 10 through passage 17, ports 30 and 18 to the atmosphere and since the fluid in chamber 7 is bottled up by the closing of valve 14, when the fluid pressure in chamber 8 acting on piston 6 has reduced to a degree substantially equal to the pressure in chamber 7, the piston 6 is forced downwardly, seating the pilot valve 21 and the main vent valve 22, so that further flow of fluid from the brake pipe is cut off.

Since the port 18 is smaller than the port 30, fluid pressure accumulates in the space below the closing valve device 12 and this holds the valve device open until the pressure of fluid remaining in the brake pipe and acting on the upper exposed area thereof exceeds the pressure in said space, when the closing valve device is shifted to its atmospheric seat. Fluid in pressure chambers 8 and 10 will then equalize with the fluid pressure remaining in the brake pipe. The parts are now in normal position and upon increasing the brake pipe pressure, the various chambers of the vent valve device are recharged to the normal pressure in the same manner as described in initially charging the system with fluid under pressure. It will now be evident that since the piston 6 is only required to operate the small area pilot valve 21, the same is correspondingly sensitive to variations in brake pipe pressure, while the vent valve 22 may be made large, so as to provide a large vent opening through which fluid is rapidly vented from the brake pipe.

Having now described our invention, what we claim as new and desire to secure by Letters Patent, is:

1. In a fluid pressure brake, the combination with a brake pipe, of a vent valve normally subject on one side to fluid pressure for controlling a brake pipe vent port and having a port adapted to connect the opposite sides of the valve, a piston subject to brake pipe pressure and a pilot valve operated by said piston upon a sudden reduction in brake pipe pressure for opening said connecting port for venting fluid from said vent valve to open the same.

2. In a fluid pressure brake, the combination with a brake pipe, of a vent valve normally subject on opposite sides to fluid under pressure for controlling a brake pipe vent port and having a port therethrough, a piston subject on one side to fluid pressure and on the opposite side to brake pipe pressure and a pilot valve actuated by said piston upon a predetermined rate of reduction in brake pipe pressure for opening the port through the vent valve, thereby venting fluid from one side of said vent valve to effect the opening thereof.

3. In a fluid pressure brake, the combination with a brake pipe, of a vent valve for controlling a brake pipe vent port and normally subject on one side over a restricted area to fluid pressure and having means for normally equalizing the fluid pressures on opposite sides thereof, a piston subject on one side to brake pipe pressure and having means for equalizing the fluid pressures on opposite sides, and a pilot valve actuated by said piston upon a sudden reduction in brake pipe pressure for venting fluid from one side of said vent valve to operate the same.

4. In a fluid pressure brake, the combination with a brake pipe, of a brake pipe vent valve normally subject to opposing fluid pressures and having a restricted vent port therethrough, a pilot valve for normally closing said port, and a piston operated upon a sudden reduction in brake pipe pressure for actuating said pilot valve to open the restricted vent port and thereby vent fluid from one side of said brake pipe vent valve to effect the opening thereof.

In testimony whereof we have hereunto set our hands.

WALTER V. TURNER.
PATRICK H. DONOVAN.

Witnesses:
A. M. CLEMENTS,
S. W. KEEFER.

Copies of this patent may be obtained for five cents each, by addressing the "Commissioner of Patents, Washington, D. C."